United States Patent
Kaneko et al.

(10) Patent No.: US 10,364,716 B2
(45) Date of Patent: Jul. 30, 2019

(54) EXHAUST GAS CONTROL APPARATUS FOR INTERNAL COMBUSTION ENGINE AND EXHAUST GAS CONTROL METHOD FOR INTERNAL COMBUSTION ENGINE

(71) Applicant: Toyota Jidosha Kabushiki Kaisha, Toyota-shi Aichi-ken (JP)

(72) Inventors: Naoya Kaneko, Gotemba (JP); Takayuki Ohtsuka, Susono (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 68 days.

(21) Appl. No.: 15/858,344

(22) Filed: Dec. 29, 2017

(65) Prior Publication Data

US 2018/0202336 A1    Jul. 19, 2018

(30) Foreign Application Priority Data

Jan. 13, 2017    (JP) .................................. 2017-004113

(51) Int. Cl.
*F01N 3/023*    (2006.01)
*F01N 3/08*    (2006.01)
(Continued)

(52) U.S. Cl.
CPC ......... *F01N 3/0238* (2013.01); *F01N 3/0253* (2013.01); *F01N 3/035* (2013.01); *F01N 3/0814* (2013.01); *F01N 3/0864* (2013.01); *F01N 3/103* (2013.01); *F01N 3/2033* (2013.01); *F01N 9/002* (2013.01); *F01N 13/009* (2014.06);
(Continued)

(58) Field of Classification Search
CPC .. F02D 41/0255; F02D 41/029; F02D 41/064; F02D 41/1454; F02D 41/1475; F01N 3/0238; F01N 3/035; F01N 3/2006; F01N 2430/08
See application file for complete search history.

(56) References Cited

U.S. PATENT DOCUMENTS

| 6,340,014 B1 | 1/2002 | Tomita et al. |
| 2011/0072788 A1* | 3/2011 | Ruona ................ F01N 3/023 60/276 |

(Continued)

FOREIGN PATENT DOCUMENTS

| JP | H11324765 A | 11/1999 |
| JP | 2001-182586 A | 7/2001 |
| JP | 2002-276443 A | 9/2002 |

*Primary Examiner* — Jonathan R Matthias
(74) *Attorney, Agent, or Firm* — Dinsmore & Shohl LLP

(57) ABSTRACT

An exhaust gas control apparatus includes a first catalyst, a filter, and an electronic control unit. The electronic control unit is configured to alternately execute lean control and rich control multiple times. The lean control is control for, over a period longer than a period from when a target air-fuel ratio is set to a predetermined lean air-fuel ratio until an air-fuel ratio of exhaust gas flowing out from the first catalyst becomes greater than the stoichiometric air-fuel ratio, setting the target air-fuel ratio to the predetermined lean air-fuel ratio. The rich control is control for, over a period longer than a period from when the target air-fuel ratio is set to a predetermined rich air-fuel ratio until the air-fuel ratio of exhaust gas flowing out from the first catalyst becomes smaller than the stoichiometric air-fuel ratio, setting the target air-fuel ratio to the predetermined rich air-fuel ratio.

4 Claims, 5 Drawing Sheets

(51) Int. Cl.
    *F02D 41/22*   (2006.01)
    *F02D 41/02*   (2006.01)
    *F02D 13/02*   (2006.01)
    *F02D 45/00*   (2006.01)
    *F01N 3/10*    (2006.01)
    *F01N 3/20*    (2006.01)
    *F01N 9/00*    (2006.01)
    *F01N 3/025*   (2006.01)
    *F01N 3/035*   (2006.01)
    *F01N 13/00*   (2010.01)
    *F02D 41/06*   (2006.01)
    *F02D 41/14*   (2006.01)
    *F02D 41/30*   (2006.01)
    *F02D 41/40*   (2006.01)

(52) U.S. Cl.
    CPC ........ *F02D 13/0211* (2013.01); *F02D 41/025* (2013.01); *F02D 41/029* (2013.01); *F02D 41/0235* (2013.01); *F02D 41/0245* (2013.01); *F02D 41/0255* (2013.01); *F02D 41/064* (2013.01); *F02D 41/1454* (2013.01); *F02D 41/1475* (2013.01); *F02D 41/222* (2013.01); *F02D 45/00* (2013.01); *F01N 2430/06* (2013.01); *F01N 2550/04* (2013.01); *F01N 2560/025* (2013.01); *F01N 2560/06* (2013.01); *F01N 2610/03* (2013.01); *F01N 2610/146* (2013.01); *F01N 2900/0411* (2013.01); *F01N 2900/0422* (2013.01); *F01N 2900/08* (2013.01); *F01N 2900/1402* (2013.01); *F01N 2900/1404* (2013.01); *F01N 2900/1602* (2013.01); *F01N 2900/1606* (2013.01); *F01N 2900/1812* (2013.01); *F01N 2900/1821* (2013.01); *F02D 41/3023* (2013.01); *F02D 41/402* (2013.01); *F02D 2041/0265* (2013.01); *F02D 2200/0802* (2013.01); *Y02T 10/26* (2013.01); *Y02T 10/47* (2013.01)

(56) References Cited

U.S. PATENT DOCUMENTS

| | | | |
|---|---|---|---|
| 2011/0219752 A1* | 9/2011 | Gonze | F01N 3/023 60/286 |
| 2012/0031072 A1* | 2/2012 | Gonze | F01N 3/101 60/273 |
| 2012/0210699 A1* | 8/2012 | Ruhland | F01N 3/023 60/274 |

* cited by examiner

EXHAUST GAS CONTROL APPARATUS FOR INTERNAL COMBUSTION ENGINE AND EXHAUST GAS CONTROL METHOD FOR INTERNAL COMBUSTION ENGINE

CROSS-REFERENCE TO RELATED APPLICATIONS

This application claims priority to Japanese Patent Application No. 2017-004113 filed on Jan. 13, 2017, incorporated herein by reference in its entirety.

BACKGROUND

1. Technical Field

The present disclosure relates to an exhaust gas control apparatus for an internal combustion engine and an exhaust gas control method for an internal combustion engine.

2. Description of Related Art

A filter that traps particulate matter (hereinafter, referred to as PM) in exhaust gas is provided in an exhaust passage of an internal combustion engine. In a case where a PM amount (hereinafter, referred to as a PM deposition amount) trapped in the filter reaches a given amount, processing for eliminating the PM through oxidation is executed. The above-described processing is referred to as filter regeneration. In order that the PM trapped in the filter is oxidized, a temperature of the filter needs to be equal to or higher than a predetermined temperature, and an oxygen concentration of exhaust gas flowing into the filter needs to be equal to or greater than a predetermined concentration.

A technique that regenerates a filter in a diesel engine is known (for example, see Japanese Unexamined Patent Application Publication No. 2002-276443 (JP 2002-276443 A)). In the related art, fuel injection is multiple injection including fuel injection of an early stage and fuel injection of a late stage, the fuel injection timing of the early stage is set to a timing earlier than a proper injection timing of normal operation to increase a generation amount of NOx, and the fuel injection timing of the late stage is set to a timing later than the proper injection timing of the normal operation to increase an exhaust gas temperature.

Since a gasoline engine is normally operated at a stoichiometric air-fuel ratio, an oxygen concentration of exhaust gas flowing in a filter is comparatively low. For this reason, oxygen is limitedly supplied to the filter in a case where the internal combustion engine is operated at an air-fuel ratio greater than the stoichiometric air-fuel ratio, in a case where a fuel cut is performed due to deceleration, or the like.

SUMMARY

There is a case where the filter needs to be regenerated when the internal combustion engine is started under cold conditions. However, when the internal combustion engine is started under cold conditions, since the temperature of the filter is comparatively low, even in a case where the oxygen concentration of exhaust gas flowing into the filter is sufficiently high, the filter is not regenerated until the temperature of the filter becomes sufficiently high. In a case where the timing until the filter is regenerated is long, for example, the output of the internal combustion engine may be lowered due to the occurrence of clogging of the filter. Accordingly, it is desirable to quickly increase the temperature of the filter.

A configuration in which a catalyst having an oxidation ability and a small capacity is provided upstream of the filter is known. In the above-described configuration, since the capacity of the catalyst is smaller than that of the filter, the temperature of the catalyst is likely to increase even at the time of a start of the internal combustion engine. Then, in a case where the temperature of the catalyst reaches an activation temperature, it is possible to further increase a temperature of exhaust gas by allowing reaction of fuel and oxygen in the catalyst. Exhaust gas at a comparatively high temperature passes through the filter downstream of the catalyst, whereby it is possible to increase the temperature of the filter to a temperature needed for regenerating the filter. However, the temperature of the catalyst further increases during regeneration of the filter, the filter is overheated, and there is a possibility that the catalyst is thermally deteriorated.

The disclosure provides an exhaust gas control apparatus for an internal combustion engine and an exhaust gas control method for an internal combustion engine that regenerate a filter early after a start of the internal combustion engine, while efficiently suppressing thermal deterioration of a catalyst.

A first aspect of the disclosure relates to an exhaust gas control apparatus for an internal combustion engine. The exhaust gas control apparatus includes a first catalyst, a filter, and an electronic control unit. The first catalyst is provided in an exhaust passage of the internal combustion engine. The filter is provided in the exhaust passage downstream of the first catalyst and is configured to trap particulate matters in exhaust gas. The electronic control unit is configured to, in a case of regenerating the filter at a time of a start of the internal combustion engine, execute first control for increasing a temperature of the first catalyst to a predetermined temperature. The first catalyst has an oxidation ability and an oxygen storage ability. The filter supports a second catalyst that is a catalyst having an oxidation ability and an oxygen storage ability. The electronic control unit is configured to execute second control after the first control. The second control is control for alternately executing lean control and rich control multiple times. The lean control is control for, over a period longer than a period from when a target air-fuel ratio of the internal combustion engine is set to a predetermined lean air-fuel ratio that is an air-fuel ratio greater than a stoichiometric air-fuel ratio until an air-fuel ratio of exhaust gas flowing out from the first catalyst becomes greater than the stoichiometric air-fuel ratio, setting the target air-fuel ratio to the predetermined lean air-fuel ratio. The rich control is control for, over a period longer than a period from when the target air-fuel ratio is set to a predetermined rich air-fuel ratio that is an air-fuel ratio smaller than the stoichiometric air-fuel ratio until the air-fuel ratio of exhaust gas flowing out from the first catalyst becomes smaller than the stoichiometric air-fuel ratio, setting the target air-fuel ratio to the predetermined rich air-fuel ratio.

According to the first aspect of the disclosure, the first control is control for making gas at a high temperature flow out from the internal combustion engine. A temperature of exhaust gas flowing into the first catalyst is increased in the above-described manner, whereby it is possible to primarily increase the temperature of the first catalyst. When the first control is executed, since heat of exhaust gas is consumed in the first catalyst, an increase in the temperature of the filter provided downstream of the first catalyst becomes slow. The predetermined temperature may be set to a lower limit value of a temperature requested for the first catalyst or may be set to a temperature at which the first catalyst is activated. The predetermined temperature may be set to be higher than the above-described temperature.

Then, after the first control is executed, the second control is executed. In the second control, the target air-fuel ratio of the internal combustion engine is changed to the predetermined rich air-fuel ratio and the predetermined lean air-fuel ratio. It is possible to slightly increase the temperature of the second catalyst by oxidizing unburned fuel (HC, CO) with the first catalyst. However, since heat is discharged outside the exhaust passage in the exhaust passage from the first catalyst to the second catalyst, a large amount of unburned fuel is needed in order to increase the temperature of the second catalyst, and a lot of time is needed to increase the temperature of the second catalyst. In a case where heat is generated in the first catalyst so as to regenerate the filter, there is a possibility that the temperature of the first catalyst becomes excessively higher than normal and the first catalyst is thermally deteriorated. In contrast, in a case where it is possible to generate heat with the second catalyst by oxidizing unburned fuel with the second catalyst, it is possible to efficiently suppress thermal deterioration of the first catalyst and efficiently suppress discharging of heat outside the exhaust passage.

Accordingly, the rich control is performed at least until after exhaust gas having an air-fuel ratio (hereinafter, referred to as a rich air-fuel ratio) smaller than the stoichiometric air-fuel ratio flows out from the first catalyst, and the lean control is performed at least until after exhaust gas having an air-fuel ratio (hereinafter, referred to as a lean air-fuel ratio) greater than the stoichiometric air-fuel ratio flows out from the first catalyst. That is, since exhaust gas having the rich air-fuel ratio flows out from the first catalyst by continuing the rich control, it is possible to primarily supply unburned fuel to the second catalyst. Furthermore, since exhaust gas having the lean air-fuel ratio flows out from the first catalyst by continuing the lean control, it is possible to primarily supply oxygen to the second catalyst. Accordingly, since unburned fuel and oxygen are alternately supplied primarily to the second catalyst by alternately executing the rich control and the lean control, unburned fuel is oxidized in the second catalyst. With this, since heat is generated in the second catalyst, it is possible to increase the temperature of the second catalyst. Then, in a case where the lean control is executed when the temperature of the filter becomes sufficiently high, the PM trapped in the filter is oxidized.

As described above, the rich control and the lean control are alternately executed, whereby the temperature of the second catalyst quickly increases. Furthermore, since unburned fuel flows out from the first catalyst, the amount of unburned fuel oxidized with the first catalyst decreases to that extent. Accordingly, since heat generated by the first catalyst decreases, it is possible to efficiently suppress an increase in the temperature of the first catalyst. For this reason, it is possible to efficiently suppress thermal deterioration of the first catalyst. Therefore, after the temperature of the first catalyst is quickly increased by the first control, the second control is executed, whereby it is possible to regenerate the filter early while efficiently suppressing thermal deterioration of the first catalyst.

In the exhaust gas control apparatus according to the first aspect of the disclosure, the electronic control unit may be configured to, when the temperature of the first catalyst reaches a lower limit value of a temperature requested for the first catalyst, determine that the temperature of the first catalyst increases to the predetermined temperature, and end the first control and start the second control.

According to the first aspect of the disclosure, the lower limit value of the temperature requested for the first catalyst is a temperature at which unburned fuel is oxidizable in the first catalyst, and may be set to a temperature at which the first catalyst is activated. The lower limit value of the temperature requested for the first catalyst may be set to a temperature at which a controlling rate of unburned fuel is within an allowable range in the first catalyst. In a case where the temperature of the first catalyst reaches the lower limit value of the temperature requested for the first catalyst, exhaust gas can be controlled with the first catalyst. Accordingly, it is possible to give priority to an increase in the temperature of the filter over an increase in the temperature of the first catalyst. Therefore, switching is performed from the first control in which the temperature of the first catalyst is likely to increase to the second control in which the temperature of the filter is likely to increase, whereby it is possible to quickly increase the temperature of the filter.

A second aspect of the disclosure relates to an exhaust gas control method for an internal combustion engine. The internal combustion engine includes a first catalyst and a filter. The first catalyst is provided in an exhaust passage. The filter is provided in the exhaust passage downstream of the first catalyst and configured to trap particulate matters in exhaust gas. The first catalyst has an oxidation ability and an oxygen storage ability. The filter supports a second catalyst that is a catalyst having an oxidation ability and an oxygen storage ability. The internal combustion engine is configured to be controlled by an electronic control unit. The exhaust gas control method includes, in a case of regenerating the filter at a time of a start of the internal combustion engine, executing first control for increasing a temperature of the first catalyst to a predetermined temperature with the electronic control unit, and executing second control after the first control with the electronic control unit. The second control is control for alternately executing lean control and rich control multiple times. The lean control is control for, over a period longer than a period from when a target air-fuel ratio of the internal combustion engine is set to a predetermined lean air-fuel ratio that is an air-fuel ratio greater than a stoichiometric air-fuel ratio until an air-fuel ratio of exhaust gas flowing out from the first catalyst becomes greater than the stoichiometric air-fuel ratio, setting the target air-fuel ratio to the predetermined lean air-fuel ratio. The rich control is control for, over a period longer than a period from when the target air-fuel ratio is set to a predetermined rich air-fuel ratio that is an air-fuel ratio smaller than the stoichiometric air-fuel ratio until the air-fuel ratio of exhaust gas flowing out from the first catalyst becomes smaller than the stoichiometric air-fuel ratio, setting the target air-fuel ratio to the predetermined rich air-fuel ratio.

The exhaust gas control method according to the second aspect of the disclosure may further include, when the temperature of the first catalyst reaches a lower limit value of a temperature requested for the first catalyst, determining that the temperature of the first catalyst increases to the predetermined temperature, and ending the first control and starting the second control with the electronic control unit.

According to the aspects of the disclosure, it is possible to regenerate the filter early after the start of the internal combustion engine, while efficiently suppressing thermal deterioration of the catalyst.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
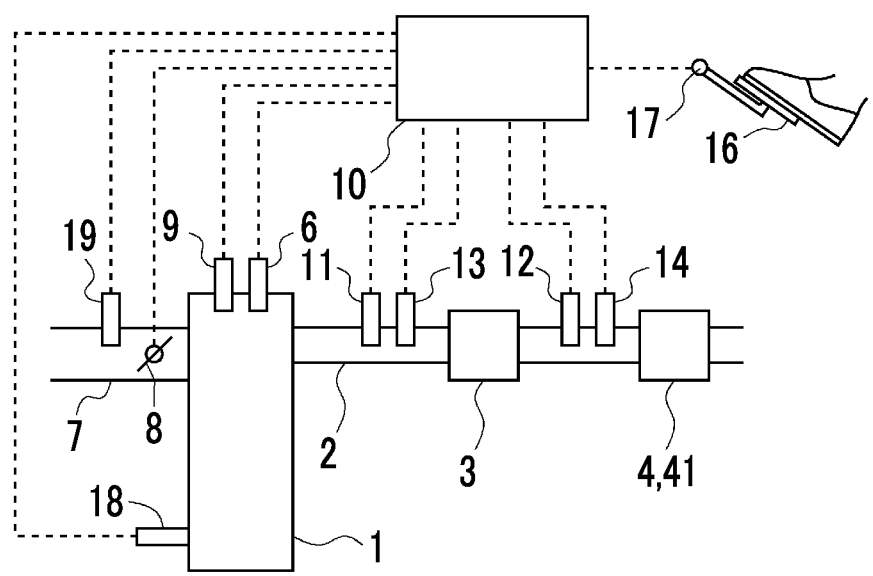
FIG. 1 is a diagram showing the schematic configuration of an internal combustion engine according to an example and an intake system and an exhaust system of the internal combustion engine.

Hereinafter, a mode for carrying out the disclosure will be illustratively described in detail referring to the drawings in connection with an example. However, the dimensions, materials, shapes, relative arrangements, and the like of components described in this example are not intended to limit the scope of the disclosure to these alone in particular as long as there are no specific statements.

EXAMPLE

FIG. 1 is a diagram showing the schematic configuration of an internal combustion engine 1 according to the example and an intake system and an exhaust system of the internal combustion engine. The internal combustion engine 1 shown in FIG. 1 is a gasoline engine. The internal combustion engine 1 is mounted in, for example, a vehicle. An exhaust passage 2 is connected to the internal combustion engine 1. In the middle of the exhaust passage 2, a first catalyst 3 as a three-way catalyst and a filter 41 that supports a second catalyst 4 as a three-way catalyst are provided in order from an upstream side.

The first catalyst 3 and the second catalyst 4 have an oxygen storage ability. That is, the first catalyst 3 stores oxygen when an air-fuel ratio of exhaust gas is greater than a stoichiometric air-fuel ratio, and discharges oxygen when the air-fuel ratio of exhaust gas is smaller than the stoichiometric air-fuel ratio. The first catalyst 3 and the second catalyst 4 have an oxidation ability. The filter 41 traps PM in exhaust gas.

In the exhaust passage 2 upstream of the first catalyst 3, a first temperature sensor 11 that detects a temperature of exhaust gas is provided. In the exhaust passage 2 downstream of the first catalyst 3 and upstream of the filter 41, a second temperature sensor 12 that detects the temperature of exhaust gas is provided. A temperature of the first catalyst 3 can be detected based on a detection value of the first temperature sensor 11 or the second temperature sensor 12. A temperature of the filter 41 can be detected based on the detection value of the second temperature sensor 12. The temperatures of the first catalyst 3 and the filter 41 may be estimated based on an operation state of the internal combustion engine 1.

In the exhaust passage 2 upstream of the first catalyst 3, a first air-fuel ratio sensor 13 that detects the air-fuel ratio of exhaust gas is provided. In the exhaust passage 2 downstream of the first catalyst 3 and upstream of the filter 41, a second air-fuel ratio sensor 14 that detects the air-fuel ratio of exhaust gas is provided. Each of the first air-fuel ratio sensor 13 and the second air-fuel ratio sensor 14 may be an oxygen concentration sensor that detects an oxygen concentration in exhaust gas.

An injection valve 6 that supplies fuel to the internal combustion engine 1 is attached to the internal combustion engine 1. In the internal combustion engine 1, an ignition plug 9 that generates electric spark inside a cylinder is provided. An intake passage 7 is connected to the internal combustion engine 1. In the middle of the intake passage 7, a throttle 8 that adjusts an intake air amount of the internal combustion engine 1 is provided. An air flowmeter 19 that detects the intake air amount of the internal combustion engine 1 is attached to the intake passage 7 upstream of the throttle 8.

In the internal combustion engine 1 configured as above, an ECU 10 that is an electronic control unit configured to control the internal combustion engine 1 is also provided. The ECU 10 controls the internal combustion engine 1 according to an operation condition of the internal combustion engine 1 or a driver's request. In addition to the above-described sensors, an accelerator operation amount sensor 17 that outputs an electrical signal according to an amount of depression on an accelerator pedal 16 by the driver and detects an engine load, and a crank position sensor 18 that detects an engine rotation speed are connected to the ECU 10 through electric wiring, and output signals of various sensors are input to the ECU 10. The injection valve 6, the throttle 8, and the ignition plug 9 are connected to the ECU 10 through electric wiring, and are controlled by the ECU 10.

The ECU 10 sets a target air-fuel ratio based on the operation state (for example, the engine rotation speed and the accelerator operation amount) of the internal combustion engine 1. Then, the throttle 8 and the injection valve 6 are controlled such that an actual air-fuel ratio becomes the target air-fuel ratio. In the example, a lean air-fuel ratio indicates an air-fuel ratio greater than a stoichiometric air-fuel ratio unless specifically stated otherwise, and a rich air-fuel ratio indicates an air-fuel ratio smaller than the stoichiometric air-fuel ratio unless specifically stated otherwise.

The ECU 10 estimates a PM deposition amount of the filter 41. The PM deposition amount may be estimated based on a past engine rotation speed and an engine load or may be estimated based on a pressure difference of exhaust gas upstream and downstream of the filter 41. The PM trapped in the filter 41 is oxidized and eliminated when the temperature of the filter 41 becomes equal to or higher than a temperature at which the PM is oxidized, and oxygen is supplied to the filter 41.

The ECU 10 regenerates the filter 41 in a case where the PM deposition amount is equal to or greater than a predetermined amount at the time of a start of the internal combustion engine 1. The predetermined amount used herein is a PM deposition amount that the filter 41 needs to be regenerated. For this reason, the ECU 10 increases the temperature of the filter 41 to the temperature (hereinafter, referred to as a PM oxidation temperature) at which the PM is oxidized in a case where the PM deposition amount is equal to or greater than the predetermined amount at the time of the start of the internal combustion engine 1. At this time, first control for increasing the temperature of the first catalyst to a predetermined temperature and second control for increasing the temperature of the filter 41 to be equal to or higher than the PM oxidation temperature are executed in order.

In the first control, for example, gas at a high temperature is discharged from the internal combustion engine 1 by a method described in Japanese Unexamined Patent Application Publication No. 11-324765 (JP 11-324765 A) or Japanese Unexamined Patent Application Publication No. 2001-182586 (JP 2001-182586 A).

For example, stratified combustion is performed by controlling a fuel injection amount and a fuel injection timing of the injection valve 6 and an ignition timing of the ignition plug 9 such that an air-fuel ratio of an air-fuel mixture layer unevenly distributed around the ignition plug 9 becomes a rich air-fuel ratio and an ignitable air-fuel ratio at the time of ignition execution of the ignition plug 9, and the air-fuel mixture layer is brought into an ignitable atomization state. When this happens, since the air-fuel ratio of the air-fuel mixture layer around the ignition plug 9 is the rich air-fuel ratio, an incomplete combustion substance (CO) is generated in a case of main combustion (ignition by spark ignition with the ignition plug 9 and subsequent combustion by flame propagation), and CO remains in a combustion chamber even after the main combustion. Furthermore, oxygen remains around the air-fuel mixture layer even after the main combustion. The remaining CO and the remaining oxygen are mixed and recombusted by gas flow inside the cylinder after the main combustion, whereby the temperature of exhaust gas increases. In regard to the method of making gas at a high temperature be discharged from the internal combustion engine 1, other known techniques may be used.

As described above, in a case where the temperature of exhaust gas of the internal combustion engine 1 becomes high in the first control, the temperature of the first catalyst 3 increases. At this time, while the temperature of the first catalyst 3 quickly increases, heat of exhaust gas is consumed in the first catalyst 3, whereby an increase in the temperature of the filter 41 becomes slow. When the temperature of the first catalyst 3 reaches a predetermined temperature (for example, activation temperature) during the execution of the first control, the ECU 10 performs switching from the first control to the second control.

In the second control, the target air-fuel ratio of the internal combustion engine 1 is alternately changed to a predetermined lean air-fuel ratio that is an air-fuel ratio greater than the stoichiometric air-fuel ratio and a predetermined rich air-fuel ratio that is an air-fuel ratio smaller than the stoichiometric air-fuel ratio. At this time, the ECU 10 alternately executes lean control and rich control multiple times. The lean control is control for, over a period longer than a period from when the target air-fuel ratio of the internal combustion engine 1 is set to the predetermined lean air-fuel ratio that is the air-fuel ratio greater than the stoichiometric air-fuel ratio until an air-fuel ratio of exhaust gas flowing out from the first catalyst 3 becomes the predetermined lean air-fuel ratio, setting the target air-fuel ratio to the predetermined lean air-fuel ratio. The rich control is control for, over a period longer than a period from when the target air-fuel ratio is set to the predetermined rich air-fuel ratio until the air-fuel ratio of exhaust gas flowing out from the first catalyst 3 becomes the predetermined rich air-fuel ratio, setting the target air-fuel ratio to the predetermined rich air-fuel ratio. Hereinafter, exhaust gas having an air-fuel ratio smaller than the stoichiometric air-fuel ratio is indicated as rich gas, and exhaust gas having an air-fuel ratio greater than the stoichiometric air-fuel ratio is indicated as lean gas.

In the example, the target air-fuel ratio of the internal combustion engine 1 may be changed to the predetermined lean air-fuel ratio and the predetermined rich air-fuel ratio such that an average value of the target air-fuel ratio of the internal combustion engine 1 becomes the stoichiometric air-fuel ratio in a period during which a period of single rich control and a period of single lean control adjacent to the period of the rich control are combined. The second control is executed by the ECU 10 adjusting a fuel injection amount from the injection valve 6 and an opening degree of the throttle 8.

In the rich control, in a case where the target air-fuel ratio of the internal combustion engine 1 is set to the predetermined rich air-fuel ratio, unburned fuel primarily flows into the first catalyst 3. In the lean control, in a case where the target air-fuel ratio of the internal combustion engine 1 is set to the predetermined lean air-fuel ratio, oxygen primarily flows into the first catalyst 3. Accordingly, the lean control and the rich control are alternately executed, whereby a large amount of oxygen and a large amount of unburned fuel alternately flow into the first catalyst 3. When this happens, since unburned fuel is oxidized by oxygen and heat is generated in the first catalyst 3, the temperature of the first catalyst 3 increases.

Since the first catalyst 3 has an oxygen storage ability, when the air-fuel ratio of exhaust gas flowing into the first catalyst 3 is the lean air-fuel ratio, oxygen is stored in the first catalyst 3, and when the air-fuel ratio of exhaust gas flowing into the first catalyst 3 is the rich air-fuel ratio, oxygen can be discharged from the first catalyst 3. For this reason, even in a case where the air-fuel ratio of exhaust gas flowing into the first catalyst 3 is the lean air-fuel ratio, oxygen is stored in the first catalyst 3, whereby the air-fuel ratio of exhaust gas flowing out from the first catalyst 3 can become the stoichiometric air-fuel ratio. Then, in a case where an oxygen storage amount of the first catalyst 3 becomes large, oxygen that cannot be stored flows out from the first catalyst 3, whereby the air-fuel ratio of exhaust gas flowing out from the first catalyst 3 becomes the lean air-fuel ratio. Even in a case where the air-fuel ratio of exhaust gas flowing into the first catalyst 3 is the rich air-fuel ratio, oxygen is discharged from the first catalyst 3, whereby the air-fuel ratio of exhaust gas flowing out from the first catalyst 3 becomes the stoichiometric air-fuel ratio. Then, in a case where the oxygen storage amount of the first catalyst 3 becomes small and discharged oxygen becomes reduced, the air-fuel ratio of exhaust gas flowing out from the first catalyst 3 becomes the rich air-fuel ratio.

Accordingly, in a case where the target air-fuel ratio of the internal combustion engine 1 is changed to the predetermined lean air-fuel ratio and the predetermined rich air-fuel ratio within a range in which the air-fuel ratio of exhaust gas flowing out from the first catalyst 3 becomes the stoichiometric air-fuel ratio, most of unburned fuel flowing into the first catalyst 3 is oxidized in the first catalyst 3, whereby the temperature of the first catalyst 3 quickly increases. With this, the temperature of the filter 41 also increases. However, in a case where the filter 41 is regenerated by increasing the temperature of the filter 41 in the above-described manner, there is a possibility that the first catalyst 3 is overheated. In a case where heat is generated in the first catalyst 3, heat is discharged in the exhaust passage 2 to the second catalyst 4.

In contrast, at the time of the lean control, a period during which the target air-fuel ratio of the internal combustion engine 1 is set to the predetermined lean air-fuel ratio is made comparatively long to make lean gas flow out from the first catalyst 3. At the time of the rich control, a period during which the target air-fuel ratio of the internal combustion engine 1 is set to the predetermined rich air-fuel ratio is made comparatively long to make rich gas flow out from the first catalyst 3. That is, at the time of the lean control, a larger amount of oxygen than oxygen storable in the first catalyst 3 is made to flow into the first catalyst 3, and at the time of the rich control, a larger amount of unburned fuel than unburned fuel oxidizable with oxygen stored in the first catalyst 3 is made to flow into the first catalyst 3.

In the lean control, in a period from when the target air-fuel ratio of the internal combustion engine 1 is set to the predetermined lean air-fuel ratio until lean gas flows out from the first catalyst 3, most of oxygen flowing into the first catalyst 3 is stored in the first catalyst 3. Subsequently, in a case where the lean control is executed successively, since oxygen is hardly stored in the first catalyst 3, oxygen flows out from the first catalyst 3. Oxygen is supplied to the second catalyst 4, whereby oxygen is stored in the second catalyst 4.

In the rich control, in a period from when the target air-fuel ratio of the internal combustion engine 1 is set to the predetermined rich air-fuel ratio until rich gas flows out from the first catalyst 3, since most of unburned fuel flowing into the first catalyst 3 is oxidized by oxygen stored in the first catalyst 3, heat can be generated in the first catalyst 3. Subsequently, in a case where the rich control is executed successively, since oxygen is hardly discharged from the first catalyst 3, and unburned fuel is hardly oxidized in the first catalyst 3, an increase in the temperature of the first catalyst 3 is efficiently suppressed. Furthermore, since unburned fuel flows out from the first catalyst 3, unburned fuel is supplied to the second catalyst 4. Unburned fuel is oxidized by oxygen stored in the second catalyst 4, and heat is generated. With this, the temperature of the filter 41 increases.

The lean control and the rich control are alternately executed, heat is repeatedly generated in the second catalyst 4, and the temperature of the second catalyst 4 efficiently increases. Then, after the temperature of the filter 41 increases to the PM oxidation temperature, in a case where lean gas flows into the filter 41 at the time of the lean control, the PM trapped in the filter 41 is oxidized. With this, the filter 41 is regenerated.

As described above, the second control is executed after the temperature of the first catalyst 3 is quickly increased through the first control, whereby it is possible to quickly increase the temperature of the second catalyst 4 while efficiently suppressing thermal deterioration of the first catalyst 3 due to overheating. With this, it is possible to regenerate the filter 41 early while efficiently suppressing thermal deterioration of the first catalyst 3.

Figure 2:
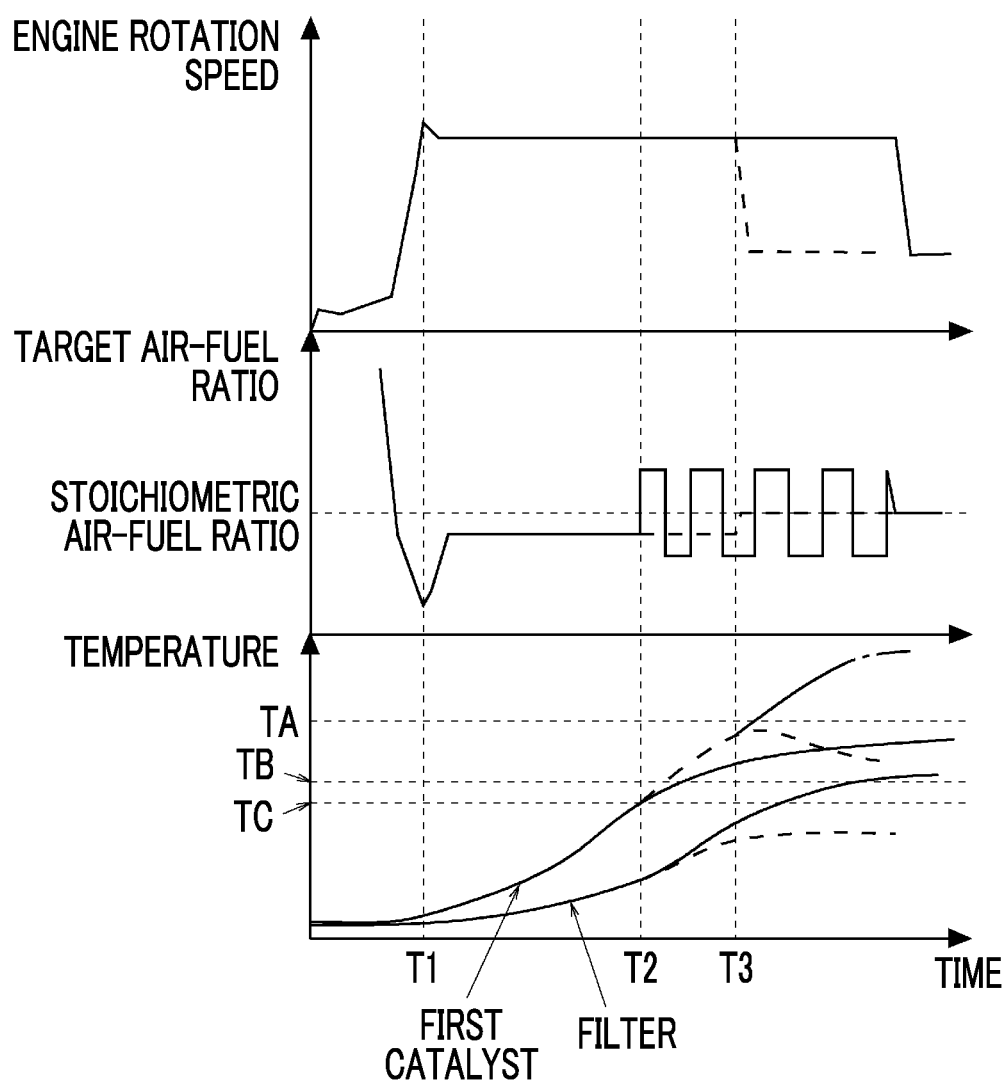
FIG. 2 is a time chart showing transition of an engine rotation speed when a filter is regenerated after a start of the internal combustion engine, a target air-fuel ratio of the internal combustion engine, and temperatures of a first catalyst and a filter.

FIG. 2 is a time chart showing transition of the engine rotation speed when the filter 41 is regenerated after the start of the internal combustion engine 1, the target air-fuel ratio of the internal combustion engine 1, and the temperatures of the first catalyst 3 and the filter 41. A solid line indicates a case where the first control and the second control according to the example are executed, and a broken line indicates a case where the first control is executed even after the temperature of the first catalyst 3 increases to be equal to or higher than the predetermined temperature (hereinafter, referred to as a case where comparison control is executed). TA represents a temperature at which the first catalyst 3 is thermally deteriorated, TB represents a lower limit value (that is, a PM oxidation temperature) of the temperature needed for regenerating the filter 41, and TC represents the lower limit value (that is, the predetermined temperature) of the temperature requested for the first catalyst 3.

T1 is a time when temperature increase control for increasing the temperatures of the first catalyst 3 and the filter 41 is started after the start of the internal combustion engine 1. In the temperature increase control, the first control is first started, and then, the second control is started at the time of an end of the first control. Accordingly, the first control is started from T1. In the first control, the target air-fuel ratio of the internal combustion engine 1 is set to the rich air-fuel ratio. Then, the first control is executed until a time indicated by T2. In a period from T1 to T2, while the temperature of the first catalyst 3 quickly increases through the first control, an increase in the temperature of the second catalyst 4 is slow. At time T2, the temperature of the first catalyst 3 reaches the lower limit value TC of the temperature requested for the first catalyst 3. For this reason, at T2, the first control ends and the second control is started.

In a period after T2, in a case where the comparison control is executed, a temperature increase rate of the first catalyst 3 becomes large compared to a case where the second control according to the example is executed. However, since heat of exhaust gas is discharged to the outside in the exhaust passage 2 from the first catalyst 3 to the filter 41, a temperature increase rate of filter 41 becomes relatively small. For this reason, in a case where the comparison control is executed, a lot of time is needed until the temperature of the filter 41 increases the lower limit value TB of the temperature needed for regenerating the filter 41. In addition, there is a possibility that the temperature of the first catalyst 3 becomes excessively higher than normal and the first catalyst 3 is thermally deteriorated. For this reason, in a case where the comparison control is executed, the engine rotation speed is decreased before the temperature of the first catalyst 3 reaches the temperature TA at which thermal deterioration occurs, whereby an increase in the temperature of the first catalyst 3 is efficiently suppressed. With this, an increase in the temperature of the filter 41 becomes slower. In a case where the engine rotation speed is not decreased, as indicated by a one-dot-chain line, there is a possibility that the temperature of the first catalyst 3 becomes higher than the temperature TA at which thermal deterioration occurs.

In a case where the second control according to the example is executed, since it is possible to decrease the temperature increase rate of the first catalyst 3, and to increase the temperature increase rate of the filter 41, it is possible to quickly increase the temperature of the filter 41 to the lower limit value TB of the temperature needed for regenerating the filter 41 while efficiently suppressing an increase in the temperature of the first catalyst 3 to the temperature TA at which thermal deterioration occurs.

Figure 3:
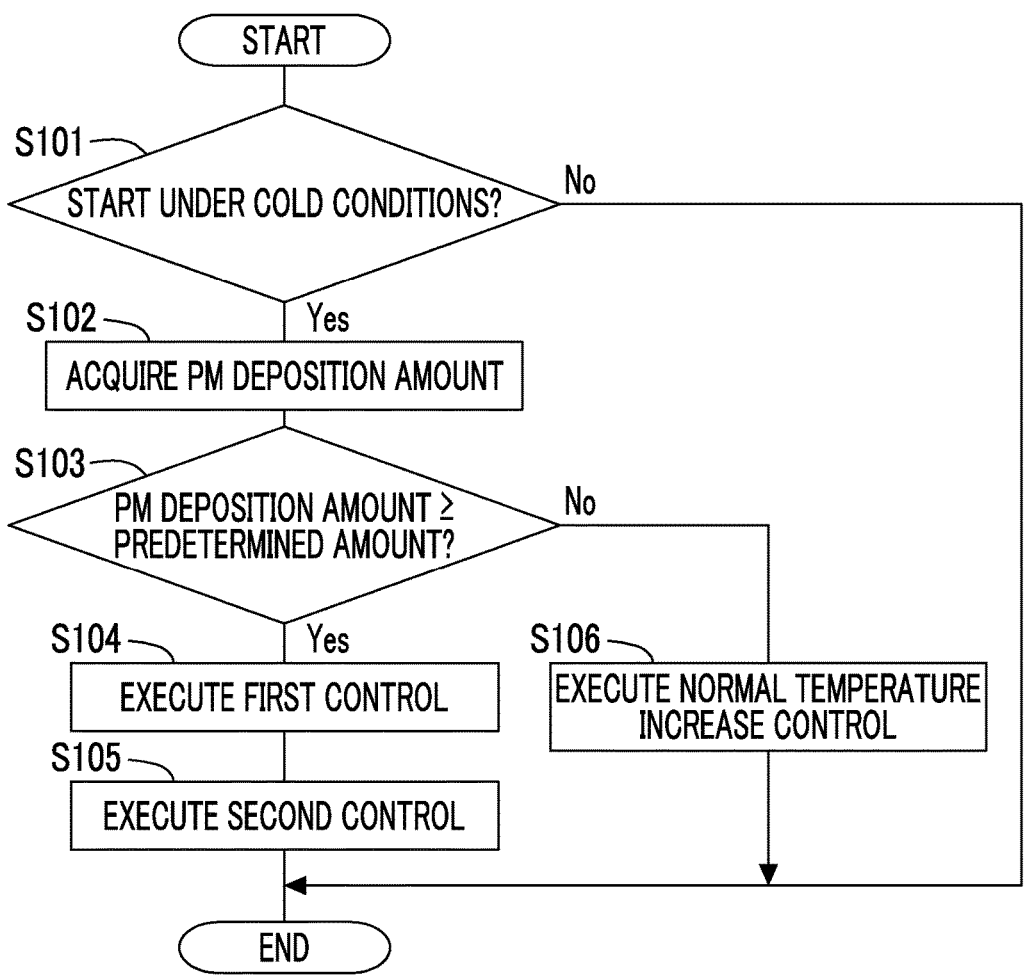
FIG. 3 is a flowchart showing a flow of temperature increase control according to the example.

FIG. 3 is a flowchart showing a flow of the temperature increase control according to the example. The flowchart is executed by the ECU 10 at the time of the start of the internal combustion engine 1.

In Step S101, determination is made whether or not the internal combustion engine 1 is started under cold conditions. In Step S101, for example, determination is made whether or not the first catalyst 3 and the second catalyst 4 are in a state in which exhaust gas cannot be purified. For example, in a case where a temperature of a coolant of the internal combustion engine 1 is a temperature at which it is considered that the start is made under cold conditions, the determination in Step S101 is affirmative.

In Step S101, instead of determining whether or not the internal combustion engine 1 is started under cold conditions, determination may be made whether or not there is a request for increasing the temperatures of the first catalyst 3 and the second catalyst 4. In a case where the determination in Step S101 is affirmative, the process progresses to Step S102, and in a case where the determination in Step S101 is negative, the flowchart is ended.

In Step S102, the PM deposition amount of the filter 41 is acquired. The PM deposition amount of the filter 41 is calculated separately by the ECU 10.

In Step S103, determination is made whether or not the PM deposition amount of the filter 41 is equal to or greater than the predetermined amount. In Step S103, determination is made whether or not the filter 41 needs to be regenerated. In a case where the determination in Step S103 is affirmative, the process progresses to Step S104, and in a case where the determination in Step S103 is negative, the process progresses to Step S106.

In Step S104, the first control is executed. The first control will be described below. In Step S105, the second control is executed. The second control will be described below. In Step S106, normal temperature increase control is executed. The normal temperature increase control used herein is a control for a case where the filter 41 is not regenerated, and is a control for quickly increasing the temperature of the first catalyst 3. For example, the same control as the first control may be executed until the temperature of the first catalyst 3 becomes equal to or higher than the predetermined temperature, or other kinds of known control may be executed. For example, in the normal temperature increase control, the first control may be executed first, and then, the target air-fuel ratio of the internal combustion engine 1 may be changed to the lean air-fuel ratio and the rich air-fuel ratio at comparatively short intervals such that the air-fuel ratio of exhaust gas flowing out from the first catalyst 3 becomes the stoichiometric air-fuel ratio. As described above, the target air-fuel ratio is changed to the rich air-fuel ratio and the lean air-fuel ratio at comparatively short intervals, whereby oxygen is primarily supplied to the first catalyst 3 when the target air-fuel ratio is the lean air-fuel ratio, and unburned fuel is primarily supplied to the first catalyst 3 when the target air-fuel ratio is the rich air-fuel ratio. For this reason, unburned fuel is oxidized and heat is generated in the first catalyst 3, and the temperature of the first catalyst 3 quickly increases. The ECU 10 functions as a control device in the disclosure by processing Steps S104 and S105.

Figure 4:
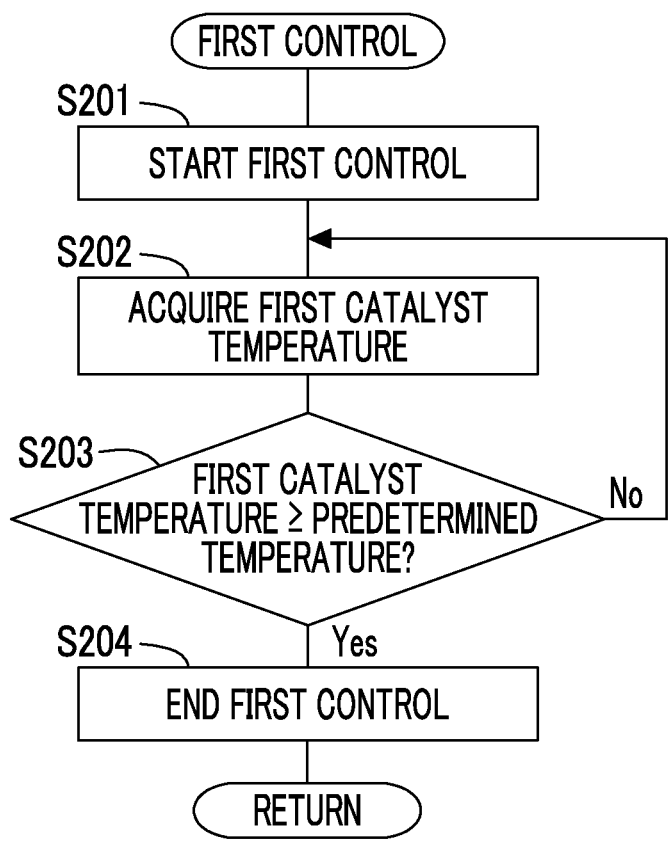
FIG. 4 is a flowchart showing a flow of first control.

Next, the first control will be described. FIG. 4 is a flowchart showing a flow of the first control. The flowchart shown in FIG. 4 is executed in Step S104 of the flowchart shown in FIG. 3.

In Step S201, the first control is started. The first control starts, whereby gas at a high temperature is discharged from the internal combustion engine 1.

In Step S202, the temperature of the first catalyst 3 is acquired. The ECU 10 detects the temperature of the first catalyst 3 based on the detection value of the first temperature sensor 11 or the second temperature sensor 12, or estimates the temperature of the first catalyst 3 based on the operation state of the internal combustion engine 1.

In Step S203, determination is made whether or not the temperature of the first catalyst 3 is equal to or higher than the predetermined temperature. In Step S203, the temperature of the first catalyst 3 reaches the lower limit value of the temperature requested for the first catalyst 3, whereby determination is made whether or not an end condition of the first control is established. In a case where the determination in Step S203 is affirmative, the process progresses to Step S204 and the first control is ended. In a case where the determination in Step S203 is negative, the process returns to Step S202 and the first control is continued.

Figure 5:
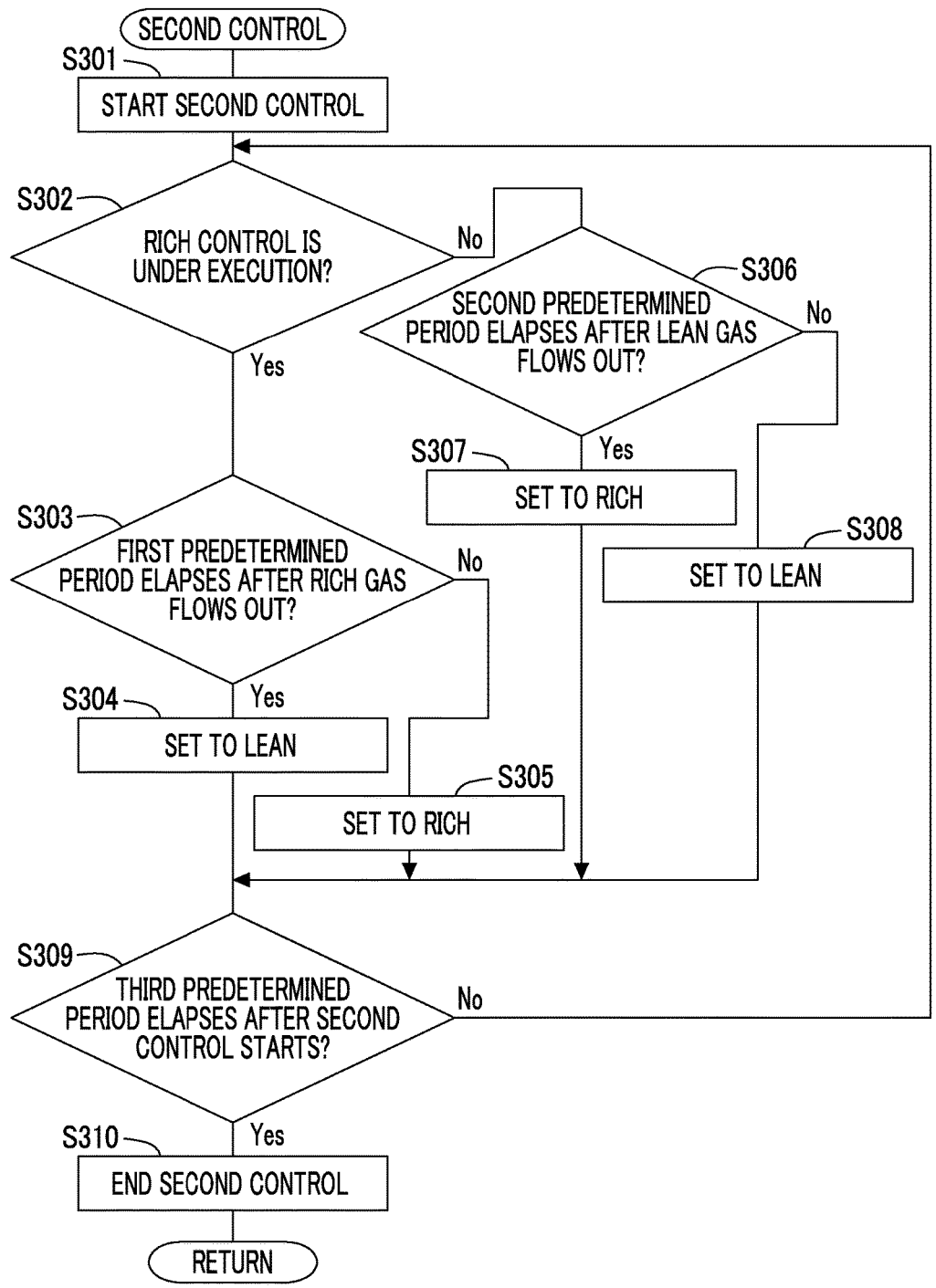
FIG. 5 is a flowchart showing a flow of second control.

Next, the second control will be described. FIG. 5 is a flowchart showing a flow of the second control. The flowchart shown in FIG. 5 is executed in Step S105 of the flowchart shown in FIG. 3.

In Step S301, the second control is started. With this, for example, the rich control or the lean control is started.

In Step S302, determination is made whether or not the rich control is under execution. In a case where the determination in Step S302 is affirmative, the process progresses to Step S303, and in a case where the determination in Step S302 is negative, the process progresses to Step S306.

In Step S303, determination is made whether or not a first predetermined period elapses from rich gas flowing out from the first catalyst 3. In a case where rich gas does not flow out from the first catalyst 3 and in a case where rich gas flows out from the first catalyst 3, but the first predetermined period does not elapse, the determination is negative. In Step S303, determination is made whether or not a condition for switching the target air-fuel ratio of the internal combustion engine 1 from a predetermined rich air-fuel ratio to a predetermined lean air-fuel ratio is established. The first predetermined period, the predetermined rich air-fuel ratio, and the predetermined lean air-fuel ratio are obtained in advance by an experiment, a simulation, or the like in consideration of suppression of overheating the first catalyst 3, promotion of a temperature increase of the filter 41, suppression of deterioration of fuel efficiency, or the like. In a case where the determination in Step S303 is affirmative, the process progresses to Step S304, and the target air-fuel ratio of the internal combustion engine 1 is set to the lean air-fuel ratio. With this, switching is performed from the rich control to the lean control. In a case where the determination in Step S303 is negative, the process progresses to Step S305, and the target air-fuel ratio of the internal combustion engine 1 is set to the rich air-fuel ratio. With this, the rich control is continued.

In Step S306, determination is made whether or not a second predetermined period elapses after lean gas flows out from the first catalyst 3. In a case where lean gas does not flow out from the first catalyst 3 and in a case where lean gas flows out from the first catalyst 3, but the second predetermined period does not elapse, the determination is negative. In Step S306, determination is made whether or not a condition for switching the target air-fuel ratio of the internal combustion engine 1 from the lean air-fuel ratio to the rich air-fuel ratio is established. The second predetermined period is obtained in advance by an experiment, a simulation, or the like in consideration of suppression of overheating the first catalyst 3, promotion of a temperature increase of the filter 41, suppression of deterioration of fuel efficiency, or the like. In a case where the determination in Step S306 is affirmative, the process progresses to Step S307, and the target air-fuel ratio of the internal combustion engine 1 is set to the rich air-fuel ratio. With this, switching is performed from the lean control to the rich control. In a case where the determination in Step S306 is negative, the process progresses to Step S308, and the target air-fuel ratio of the internal combustion engine 1 is set to the lean air-fuel ratio. With this, the lean control is continued.

In Step S309, determination is made whether or not a third predetermined period elapses from the second control start time. A third predetermined period is a period needed for the temperature of the filter 41 to increase to the PM oxidation temperature. The third predetermined period is obtained in advance by an experiment, a simulation, or the like. The temperature of the filter 41 may be acquired, and in a case where the temperature of the filter 41 increases to the PM oxidation temperature, determination may be made that the third predetermined period elapses. In a case where the determination in Step S309 is affirmative, the process progresses to Step S310, and the second control is ended. With this, the target air-fuel ratio of the internal combustion engine 1 is set to a value according to the operation state. In a case where the determination in Step S309 is negative, the process returns to Step S302, and the second control is continued.

As described above, the first control is executed when the internal combustion engine 1 is started under cold conditions, whereby it is possible to quickly increase the temperature of the first catalyst 3. The second control is executed after the first control ends to alternately repeat the rich control and the lean control, whereby it is possible to make unburned fuel be oxidized in the second catalyst 4 while efficiently suppressing an increase in the temperature of the first catalyst 3. For this reason, it is possible to efficiently and quickly increase the temperature of the second catalyst 4. With this, it is possible to regenerate the filter 41 early while efficiently suppressing thermal deterioration of the first catalyst 3.

What is claimed is:

1. An exhaust gas control apparatus for an internal combustion engine, the exhaust gas control apparatus comprising:
    a first catalyst provided in an exhaust passage of the internal combustion engine, the first catalyst having an oxidation ability and an oxygen storage ability;
    a filter provided in the exhaust passage downstream of the first catalyst and configured to trap particulate matters in exhaust gas, the filter supporting a second catalyst that is a catalyst having an oxidation ability and an oxygen storage ability; and
    an electronic control unit configured to, in a case of regenerating the filter at a time of a start of the internal combustion engine, execute first control for increasing a temperature of the first catalyst to a predetermined temperature, wherein:
    the electronic control unit is configured to execute second control after the first control;
    the second control is control for alternately executing lean control and rich control multiple times;
    the lean control is control for, over a period longer than a period from when a target air-fuel ratio of the internal combustion engine is set to a predetermined lean air-fuel ratio that is an air-fuel ratio greater than a stoichiometric air-fuel ratio until an air-fuel ratio of exhaust gas flowing out from the first catalyst becomes greater than the stoichiometric air-fuel ratio, setting the target air-fuel ratio to the predetermined lean air-fuel ratio; and
    the rich control is control for, over a period longer than a period from when the target air-fuel ratio is set to a predetermined rich air-fuel ratio that is an air-fuel ratio smaller than the stoichiometric air-fuel ratio until the air-fuel ratio of exhaust gas flowing out from the first catalyst becomes smaller than the stoichiometric air-fuel ratio, setting the target air-fuel ratio to the predetermined rich air-fuel ratio.

2. The exhaust gas control apparatus according to claim 1, wherein the electronic control unit is configured to, when the temperature of the first catalyst reaches a lower limit value of a temperature requested for the first catalyst, determine that the temperature of the first catalyst increases to the predetermined temperature, and end the first control and start the second control.

3. An exhaust gas control method for an internal combustion engine, the internal combustion engine configured to include a first catalyst provided in an exhaust passage, and a filter provided in the exhaust passage downstream of the first catalyst and configured to trap particulate matters in exhaust gas, the first catalyst having an oxidation ability and an oxygen storage ability, the filter supporting a second catalyst that is a catalyst having an oxidation ability and an oxygen storage ability, and the internal combustion engine configured to be controlled by an electronic control unit, the exhaust gas control method comprising:
    in a case of regenerating the filter at a time of a start of the internal combustion engine, executing first control for increasing a temperature of the first catalyst to a predetermined temperature with the electronic control unit; and
    executing second control after the first control with the electronic control unit, wherein:
    the second control is control for alternately executing lean control and rich control multiple times;
    the lean control is control for, over a period longer than a period from when a target air-fuel ratio of the internal combustion engine is set to a predetermined lean air-fuel ratio that is an air-fuel ratio greater than a stoichiometric air-fuel ratio until an air-fuel ratio of exhaust gas flowing out from the first catalyst becomes greater than the stoichiometric air-fuel ratio, setting the target air-fuel ratio to the predetermined lean air-fuel ratio; and
    the rich control is control for, over a period longer than a period from when the target air-fuel ratio is set to a predetermined rich air-fuel ratio that is an air-fuel ratio smaller than the stoichiometric air-fuel ratio until the air-fuel ratio of exhaust gas flowing out from the first catalyst becomes smaller than the stoichiometric air-fuel ratio, setting the target air-fuel ratio to the predetermined rich air-fuel ratio.

4. The exhaust gas control method according to claim 3, further comprising, when the temperature of the first catalyst reaches a lower limit value of a temperature requested for the first catalyst, determining that the temperature of the first catalyst increases to the predetermined temperature, and ending the first control and starting the second control with the electronic control unit.

* * * * *